June 10, 1941.                R. A. SANDBERG                2,244,898
FENDER GUARD STRUCTURE
Filed Oct. 7, 1939
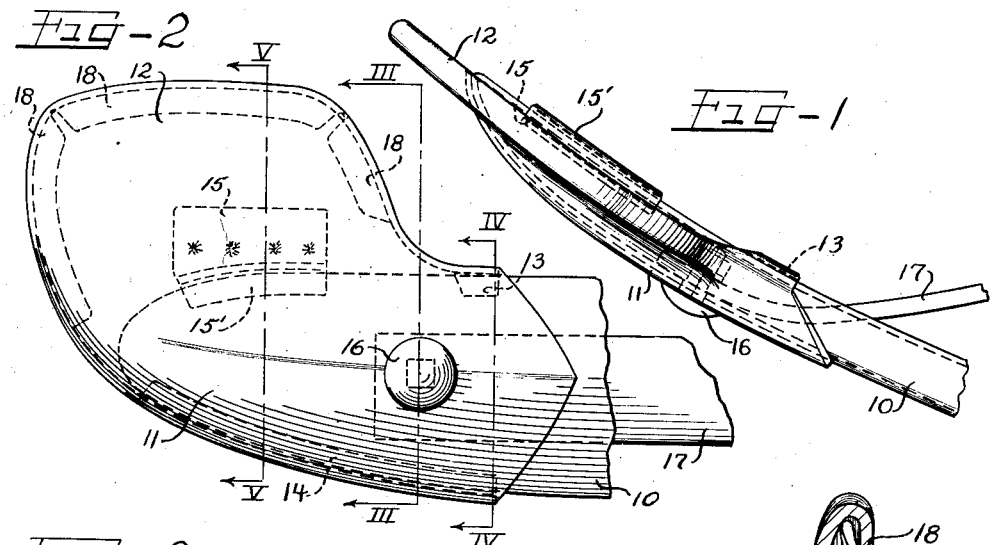
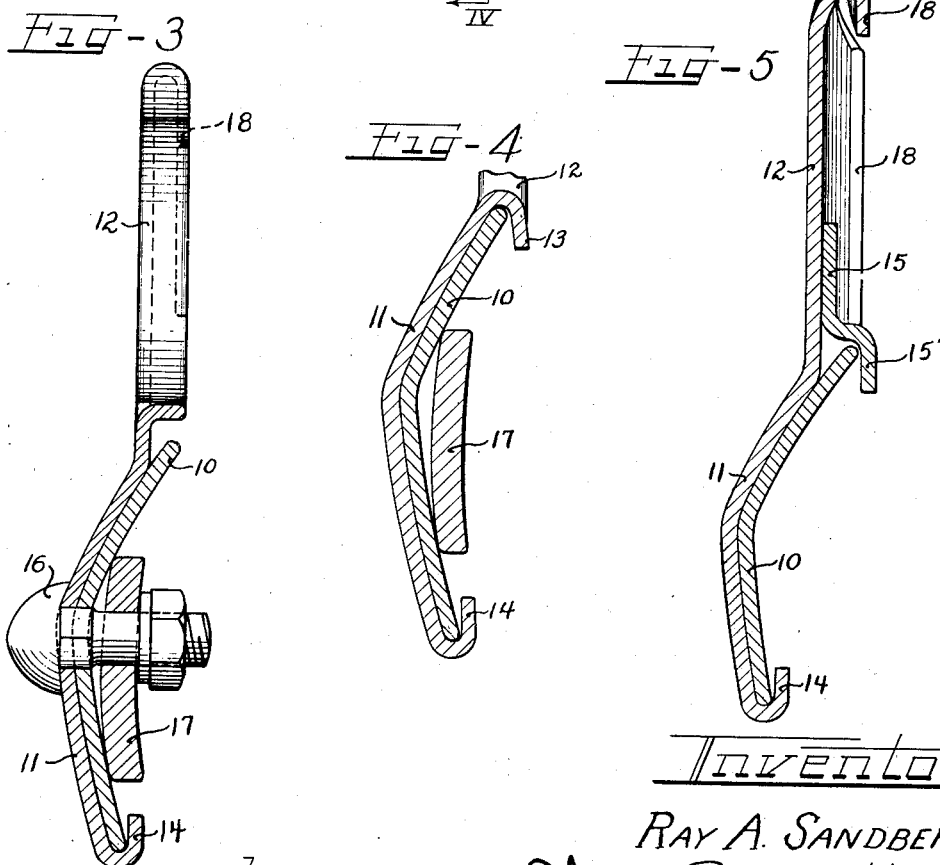
Inventor
Ray A. Sandberg Patented June 10, 1941

2,244,898

UNITED STATES PATENT OFFICE 2,244,898

FENDER GUARD STRUCTURE

Ray A. Sandberg, Waukegan, Ill., assignor to Houdaille-Hershey Corporation, Detroit, Mich., a corporation of Michigan Application October 7, 1939, Serial No. 298,354

1 Claim. (Cl. 293—55)

My invention relates to guard structure for automobile bumpers and particularly to guard structures readily applicable and attachable to the ends of the horizontal impact bar of a bumper structure so as to afford protection for the automobile fenders and lamps or other structures which may be mounted on the fenders.

The important object of the invention is to produce an efficient type of fender guard in the form of a unitary element provided with flanges or tongues for guiding its application to and along the end of a bumper impact bar and to hook around the upper and lower edges of the impact bar to maintain proper alignment and to assist in securing it in proper fending position.

The improved guard structure is clearly disclosed on the drawing, in which:

Figure 1 is a plan view of the end portion of an automobile bumper impact bar with a fender guard element applied thereto;

Figure 2 is a front elevation of the structure shown in Figure 1;

Figure 3 is a section on plane III—III Figure 2;

Figure 4 is a section on plane IV—IV Figure 2;

Figure 5 is a section on plane V—V Figure 2.

On the drawing figure 10 indicates one end portion of the horizontal impact bar of an automobile bumper. The bar gradually tapers vertically toward its ends and is of transverse shape to present a substantially convex front surface and a concave rear surface.

I have shown one of the fender guard structures, it being understood that one of these structures is slipped on to each end of the impact bar and secured thereto in position for protecting the fenders. The guard structure shown can be readily formed from a single piece of sheet metal and comprises a longitudinally extending body portion 11 and a guard wing portion 12 extending upwardly. The body part is of transverse shape to accord with the shape of the impact bar end portion and to fit snugly against the front side thereof. At its inner end the body portion 11 has a comparatively short flange or tongue part 13 gradually deflected downwardly to provide a hook for receiving the upper edge of the impact bar 10. Extending from the lower edge of the body portion 11 substantially along the full length thereof is a gradually upturned tongue or flange part 14 for receiving and hooking around the lower edge of the impact bar.

On the back side of the guard wing portion 12, a plate or bracket 15 of substantially ogee cross section is secured, its lower portion 15' forming a hook for paralleling and receiving the upper edge of the impact bar. The bracket may be secured to the wing in any suitable manner but is preferably welded thereto. The flanges or tongue portions 13, 14 and 15' form guideways which enable the guard body to readily slip onto and along the end of the impact bar and when the guard structure reaches its final or service position the flanges will securely hold it against vertical displacement on the impact bar. To secure the guide element against longitudinal displacement, securing means such as a bolt 16 may be used, and this bolt may be the same bolt which secures the respective impact bar end to the outer supporting bar 17 of the bumper and which extends from the vehicle chassis. The guard body 11, the impact bar 10 and the supporting bar 17 are suitably apertured for reception of the bolt. The guard member body will be intimately held by the bolt and the hook flanges snugly against the front face of the impact bar end, and the guard wing portion 12 will extend a distance laterally outwardly and upwardly from the body portion 11 to project a sufficient distance above the impact bar end in substantially vertical direction so as to afford protection for the fender and accessories such as lamps mounted on the fender.

The long lower hub flange 14 will materially strengthen the body portion 11 and also the impact bar end received by the flange. In order to strengthen and stiffen the guard wing portion 12, its peripheral portions 18 may be gradually curled or bent rearwardly and downwardly to form a rim, this rim then presenting a rounded and smooth surface to eliminate sharp edges and also to give a more pleasing appearance.

I thus provide a simple but efficient fender guard structure which can be readily and quickly slid onto the end of a bumper impact bar and secured in position for protection of the fender. I do not desire, however, to be limited to the exact construction and arrangement shown and described as changes and modifications may be made without departing from the scope of the invention.

I claim as follows:

A fender guard for the tapering end of a bumper impact bar in the form of an L-shaped structure whose longitudinally extending body part is transversely bent to fit against the front face of the impact bar tapered end and whose upstanding vertical part is widened to increase the guard area, the lower edge portion of said body part being deflected to form a continuous lower hook parallel with and for engaging around the lower edge of the impact bar tapered end when said guard is in service position, the upper edge portion of said body part being deflected to form an inner upper hook, a plate welded to said vertical part and deflected to form an outer upper hook, said inner and outer hooks engaging around the upper edge of said tapered end when the guard is in service position, said upper and lower hooks being so vertically spaced that, when said guard is in service position with said hooks in engagement with the tapered end edges, the outer end of said guard will project a distance laterally outwardly beyond the tip of said tapered end to form a continuation thereof and to properly align the vertical part of the guard relative to the vehicle fender, and means for securing said guard against lateral outward displacement on said tapered end.

RAY A. SANDBERG.